2,888,379
N-[ANTHRAQUINONYL-(1')]-2-AMINO IMIDAZOLINES

Eberhard F. Brüning, Koln-Stammheim, and Gerhard Domagk and Fritz Mietzsch, Wuppertal-Elberfeld, Germany, assignors to Farbenfabriken Bayer Aktiengesellschaft, Leverkusen, Germany, a corporation of Germany No Drawing. Application August 13, 1957
Serial No. 677,849

Claims priority, application Germany August 16, 1956

5 Claims. (Cl. 167—33)

The present invention relates to imidazoline compounds; more particularly it concerns N-[anthraquinonyl-(1')]-2-aminoimidazoline of the formula

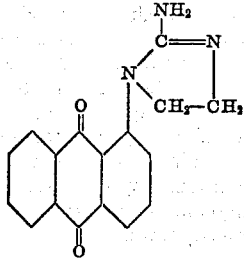

and its derivatives which are substituted in the anthraquinone radical, for instance by halogen, nitro-, imidazolyl-, alkyl- or alkoxy groups.

It has been found that N-[anthraquinonyl-(1')]-2-amino-imidazoline and its derivatives which are substituted in the anthraquinone radical can be obtained by contacting N-[anthraquinonyl-(1)]-ethylene-diamine or its derivatives which are substituted in the anthraquinone radical, with a cyanogen halide, for instance cyanogen chloride. The reaction is advantageously carried out by adding the cyanogen halide slowly to a solution of the N-[anthraquinonyl-(1')]-ethylene-diamine or its derivatives in a suitable solvent such as methanol at temperatures below room temperature and then keeping the reaction mixture at an elevated temperature for some time.

Furthermore it has been found that N-[anthraquinonyl-(1')]-2-amino-imidazoline and its derivatives which are substituted in the anthraquinone radical for instance by halogen, nitro-, imidazolyl-, alkyl- or alkoxy groups are very valuable disinfectants. They are suitable for all purposes for which disinfectants are to be considered. They are particularly suitable as additives to mouth washes and tooth pastes; they may also be considered as additives for shaving lotions, soaps or detergents, cosmetic creams, skin powders, bath additives, hair lotions, polishing wax, shoe polishes and milking fats, furthermore as additives for impregnating agents, adhesives, starch, glue and also casein and the like. They may moreover be used together with other disinfectants.

The disinfectants of the present invention may be used in a manner known as such, for example in the form of solutions or dispersions, but may also be incorporated with the materials to be disinfected or the carrier substances as such. It is expedient to employ them in the form of their salts, for example in the form of their hydrochlorides. The appropriate quantities can in each case easily be ascertained by preliminary tests.

The following table gives the inhibition values of various N-[anthraquinonyl-(1')]-2-amino-imidazoline compounds in agar-agar for a great variety of bacteria:

TABLE

A. N-[anthraquinonyl-(1')]-2-amino-imidazoline

| | |
|---|---|
| Staphylococci Flensungen | 1:1 million |
| Staphylococci Wacker | 1:1 million |
| Staphylococci Lawrensburg | 1:1 million |
| Streptococci Aronson | 1:1 million |
| Enterococci 13 | 1:500,000 |
| Pneumococci I | 1:1 million |
| B. friedlaender | 1:10,000 |
| B. coli | 1:200,000 |
| Soor | 1:25,000 |

B. N-[5'-chloro-anthraquinonyl-(1')]-2-amino-imidazoline

| | |
|---|---|
| Staphylococci Flensungen | 1:1 million |
| Staphylococci Lawrensburg | 1:800,000 |
| Streptococci Wacker | 1:200,000 |
| B. coli | 1:25,000 |

C. N-[6'-chloro-anthraquinonyl-(1')]-2-amino-imidazoline

| | |
|---|---|
| Staphylococci Flensungen | 1:1 million |
| Streptococci Wacker | 1:400,000 |
| B. friedlaender | 1:10,000 |
| B. coli | 1:25,000 |

D. 1,5-bis-[2'-amino-imidazolyl-(1')]-anthraquinone

| | |
|---|---|
| Staphylococci Flensungen | 1:25,000 |
| Streptococci Wacker | 1:1,000 |
| B. coli | 1:10,000 |

E. 1,8-bis-[2'-amino-imidazolyl-(1')]-anthraquinone

| | |
|---|---|
| Staphylococci Flensungen | 1:200,000 |
| Streptococci Wacker | 1:100,000 |
| B. coli | 1:25,000 |

The values were ascertained by embodying the imidazoline compounds in the form of their hydrochlorides with physiological common salt solutions at different dilutions, for example 1:1000, 1:100,000, 1:100,000, 1:1 million and, if desired, also at dilutions lying between these values. In each case 1 millilitre of these solutions was made up to 10 millilitres with 9 millilitres of liquid agar-agar and finally inoculated with the various germs.

The following examples serve to illustrate the production of N-[anthraquinonyl-(1')]-2-amino-imidazoline and some of its derivatives which are substituted in the anthraquinone radical without, however, limiting the scope of the present invention.

EXAMPLE 1

201 grams of N-[anthraquinonyl-(1')]-ethylene-diamine in 1500 grams of methanol are placed in a 3-litre-three-necked round flask. 53 grams of cyanogen chloride dissolved in the same quantity of methanol are added with stirring and cooling within 30 minutes. During this time the temperature is maintained at 10–15° C. The mixture is after-stirred at 25–35° C. for about 12 hours and then kept under reflux for 8 hours, during which the whole dissolves. Methanol is then distilled off until a precipitate appears, the product is cooled and the precipitated N-[anthraquinonyl-(1')]-2-amino-imidazoline hydrochloride is filtered off. Yield: 210 grams, i.e. 84 percent of the theoretical. The compound may be re-crystallized from 90–95 percent aqueous ethanol.

EXAMPLE 2

1800 grams of methanol and 150 grams of N-[5-chloro-anthraquinonyl-(1)]-ethylene-diamine (M.P. 185–186° C.) are placed in a 3-litre three-neck round-bottom flask. 33 grams of cyanogen chloride dissolved in the same quantity of methanol are slowly added with stirring and cooling. During this time the temperature is maintained at 6–16° C. The product is stirred at 22–30° C. overnight and then kept for a further 8–10 hours under reflux. The thick paste formed at 20° C. has then completely dissolved. About one half of the liquid is then distilled off, the product is cooled and allowed to crystallize. The resulting N-[5'-chloroanthraquinonyl-(1')]-2-amino-imidazoline hydrochloride of the formula

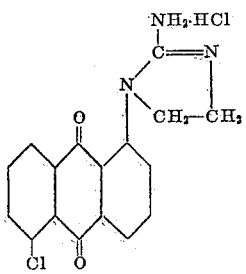

is filtered off with suction. M.P. 300° C. Yield: 162 grams, i.e. 96 percent of the theoretical. The substance may be re-crystallized from 80–90 percent aqueous ethanol.

According to a further feature of the present invention the N-[anthraquinonyl-(1)]-ethylene-diamine and its derivatives to be contacted with a cyanogen halide can be obtained in a very suitable manner by contacting, instead of the previously used 1-halo-anthraquinone or its derivatives, the corresponding 1-nitro-anthraquinones with ethylene diamine. This reaction is illustrated by the following examples:

EXAMPLE 3

63 grams of 1-nitro-anthraquinone are stirred with 280 millilitres of ethylene-diamine and maintained at 40–45° C. for 4 hours. The reaction mixture is then stirred into 1 litre of water with cooling, and the precipitate is filtered off with suction. Raw yield: 66 grams of N-[anthraquinonyl-(1)]-ethylene-diamine (M.P. 146–148° C.). The substance which forms a hydrate may be re-crystallized from ethanol (M.P. 161–162° C., uncorr.).

EXAMPLE 4

70 grams of 1-nitro-5-chloro-anthraquinone (M.P. 315° C.) and 270 millilitres of ethylene-diamine are maintained at 30° C. for 15 hours. The reaction mixture is then treated with 1 litre of ice water. The precipitate thus obtained is filtered off with suction, suspended with 200 millilitres of methanol and again filtered off with suction. Yield: 71 grams of N-[5-chloro-anthraquinonyl-(1)]-ethylene-diamine (M.P. 183° C., uncorr.). The compound may be re-crystallized from benzene.

EXAMPLE 5

209 grams of 1,8-dinitro-anthraquinone are stirred with 1200 millilitres of ethylene-diamine at 45–50° C. for 26 hours. The reaction mixture is then treated with 2500 millilitres of water, the precipitate is isolated and again suspended with 1500 millilitres of water. Yield 225 grams of 1,8-bis-($\beta$-amino-ethylamino)-anthraquinone (M.P. 162–165° C.).

In a similar manner 1,5-bis-($\beta$-amino-ethylamino)-anthraquinone is obtained by contacting 1,5-dinitro-anthraquinone with ethylene-diamine.

We claim:

1. A compound selected from the group consisting of N-[anthraquinonyl-(1')]-2-amino-imidazoline, N-[halogeno-anthraquinonyl-(1')]-2-amino-imidazoline, N-[lower alkyl-anthraquinonyl-(1')]-2-amino-imidazoline, N-[lower alkoxy-anthraquinonyl-(1')]-2-amino-imidazoline, 1,5-bis-[2'-amino-imidazoiyl-(1')]-anthraquinone, and 1,8-bis-[2'-amino-imidazolyl-(1')]-anthraquinone.

2. A process for the production of N-[anthraquinonyl-(1')]-2-amino-imidazoline and derivatives thereof which are substituted in the anthraquinone radical which comprises contacting a member selected from the group consisting of N-[anthraquinonyl-(1')]-ethylene-diamine, N-[halogeno-anthraquinonyl - (1')] - ethylene-diamine, N-[lower alkyl-anthraquinonyl-(1')]-ethylene-diamine, N-[lower alkoxy-anthraquinonyl-(1')]-ethylene-diamine, 1,5-bis-[$\beta$-amino-ethylamino] anthraquinone, and 1,8-bis-[$\beta$-amino-ethylamino]anthraquinone with a cyanogen halide.

3. A process according to claim 2 wherein the cyanogen halide is cyanogen chloride.

4. A disinfecting composition consisting of a significant amount of a compound of claim 1 and a pharmaceutically acceptable carrier.

5. A disinfecting composition according to claim 4 wherein the disinfecting agent is N-[5'-chloro-anthraquinonyl-(1')]-2-amino-imidazoline.

References Cited in the file of this patent

UNITED STATES PATENTS 2,426,577     Scalera, et al.     Aug. 26, 1947